Sept. 23, 1958     W. DANZIGER ET AL     2,853,585

VENDING SELECTOR BUTTON

Filed Oct. 10, 1955     3 Sheets-Sheet 1

INVENTORS.
William Danziger
Harold Roth
BY
James C. Ledbetter
ATTORNEY

Sept. 23, 1958 W. DANZIGER ET AL 2,853,585
VENDING SELECTOR BUTTON
Filed Oct. 10, 1955 3 Sheets-Sheet 2

INVENTORS
William Danziger
Harold Roth
BY
James C. Ledbetter
ATTORNEY

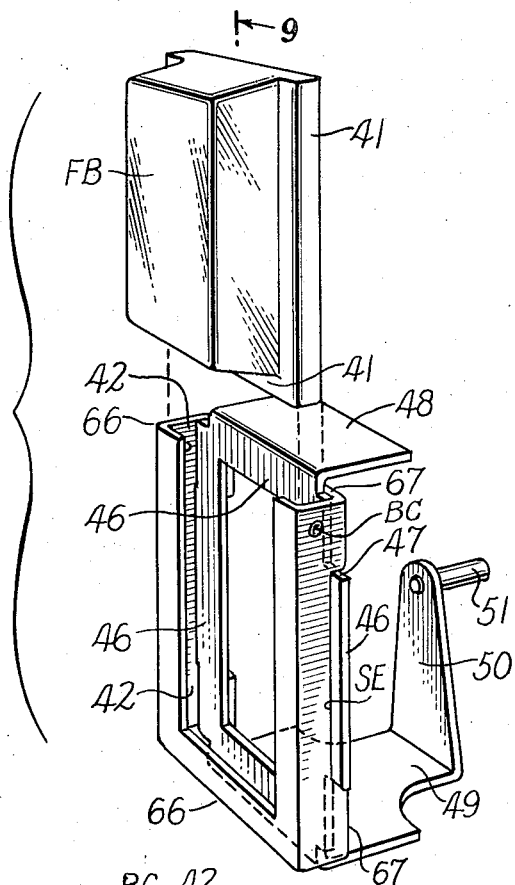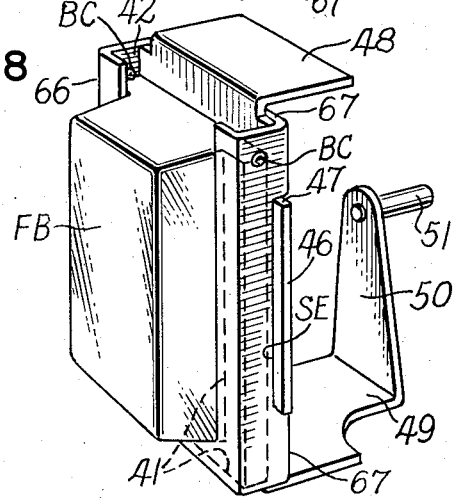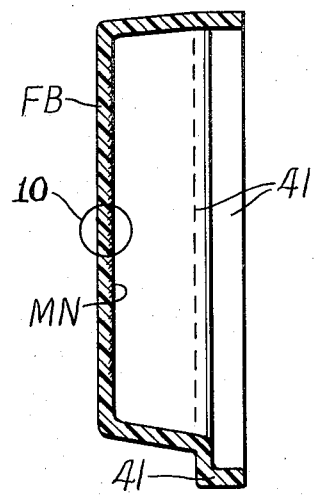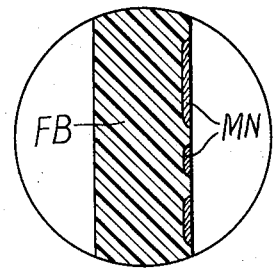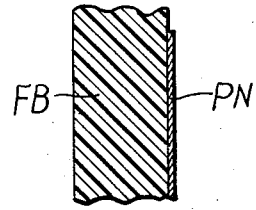

United States Patent Office 2,853,585
Patented Sept. 23, 1958

2,853,585
VENDING SELECTOR BUTTON
William Danziger, Franklin Square, and Harold Roth, Hewlett Neck, N. Y., assignors to Continental Vending Machine Corp., Westbury, N. Y., a corporation of New York
Application October 10, 1955, Serial No. 539,462
14 Claims. (Cl. 200—172)

This invention relates to improvements in self-indicating push-button switch means suitable for use in the manual control of electrical circuitry in motor operated vending machines and is entitled Vending Selector Button.

Merchandising vending machines for dispensing articles of different kinds or brands (candy, cigarettes or other packaged goods) are equipped with a plurality or a group of control buttons or knobs (manuals), each identified and operatively allocated to its particular package brand of goods stored for sale in the machines. When pushing a properly selected switch button, a purchaser can obtain a chosen package.

Of course, the customer must know which button is allocated to which brand. It is, therefore, necessary for each button in the group (plurality) to be marked and identified as to the particular kind or brand of goods (cigarette package) with which it is individually associated by its particular operating and electrical control connection in the network circuitry of the plurality of buttons.

Conventional practice identifies each switch control button by placing a brand label, a picture of the package, or other visible identifier of a brand alongside of the respective button, or somewhere adjacent to it on the front of the machine. In some cases, this conventional separation (spacing apart) of the brand label from its particular button may result in the customer's hesitating or being uncertain as to which button corresponds to which brand, and he may push the wrong button, especially so if the machine offers a large number of brand choices.

In any event, the conventional separation of the brand indexing identifiers from their respective switch buttons requires considerable space on a vending machine. An ultra-modern machine of 20 or 30 brand sales versatility would require 40 or 60 space placements on its display front, thus using considerable space. Therefore, present day design arrangements do not lend themselves to a modern machine of reduced size and of increased variety (wide choice range) in the many different brands which it stores and sells.

In addition to the foregoing space problem, it is also significant that separating the indices of identifiers from their respective buttons requires the customer first to "eye" and select one brand name from the many in the indexed group, thereafter to "eye" for that single button amongst many which matches his single selection and, finally, to push that button. These several operations on the customer's part become more tedious when the machine is of modern type and displays a large number of buttons spaced from their identifiers.

Accordingly, this invention is devoted to bettering the utility of vending machines in the foregoing respects, i. e., generally reforming their separated brand selection indexing and button grouping, by bringing them together in a unified novel arrangement including transparent buttons— featured in this invention—wherein the customer need "eye" only one element. This achieves several customer and machine design advantages.

Such a contribution to the art simplifies the indexing sales display of a large number of brands and the related group of an equally large number of buttons, both on the front of the machine. It is believed novel in its concept, compact in its structural embodiment, and an innovation in utility which makes more practical the development of smaller size machines selling a greater number of cigarette brands and, of course, having a proportionately greater number of push buttons and brand marking identifiers.

Accordingly, a purpose of this invention is to provide a brand or merchandise selector push button improved in the foregoing and other respects, in which the button per se is transparent and strikingly self-indexed with its own brand marking vividly pictured by illumination within the button area, also having simple means for changing its brand name or picture, and a selector push button mechanism also mounting a control switch for energizing its individual brand circuit so as to vend the package chosen from the self-indicating button, actually, therefore, a structurally and functionally four-in-one manual control button switch for vending machines.

Drawings and a more detailed description reveal other purposes and functional advantages to enhance appearance, reduce the size, increase the storage and sales capacity of greater variety, and make for structural simplicity.

The drawings

The accompanying drawings and this specification, as well as the claimed subject matter, disclose the invention as preferred and embodied at this time for understanding the problems sought to be solved. Since the teachings herein may suggest changes to others who wish to avail themselves of the benefits of the invention, it will be appreciated that subsequent modifications hereof may well be equivalent in form and hence the same in spirit and principle as this disclosure.

By way of introduction, it is pointed out that the official patent drawings herein are made from a production specimen and are scaled proportionately thereto. For an understanding of the size and space relationship of parts—the simple compactness of the button mechanism as a whole—it is further noted that the transparent button (Fig. 6) and its adjacent parts very closely approximate actual size. All the other views on the three sheets are set to a much larger scale than the production specimen in order better to show structural details.

The three sheets of drawings show two examples (species) of construction. A single button is shown for simplicity, a plurality thereof being required on a complete vending machine. Both examples of the invention provide a simple means for changing the brand name displayed by the button when it is desired to stock another make of goods or brand for a given button.

The first two sheets illustrate the first example of the invention comprising, among other things, an interchangeable brand identifier carried in an irremovable (captive) transparent button. A printed card or a picture is preferred as an example of indexing means to identify the goods sold and delivered by a given button.

Figure 6:
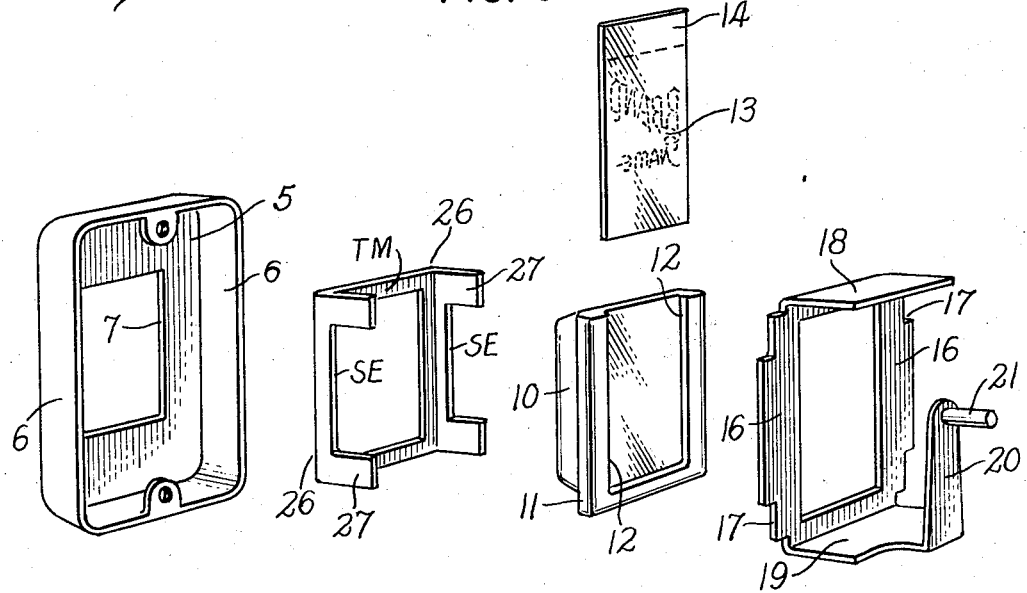

Fig. 6 is a view of the principal components of the transparent button assembly per se (switch parts omitted). Four of its parts are in horizontally spaced alignment for assembly. Also, a card identifier is disposed above and in vertical alignment with the transparent button, in readiness to be inserted in its card receiving recess constituting the viewing side of a card pocket when the four parts are assembled.

Sheet 3 of the drawings shows a second example of the invention, in which the transparent button itself constitutes the interchangeable part (the brand name identifier) and thereby serves the same purpose as the changeable card shown in the first example. Accordingly, sheet 3 features a self-indicating button organization with one part less than in the first example. A transparent button of shell form and light weight is featured, being a loose and free part as distinguished from the captive button in the first example.

Fig. 7 shows the changeable transparent button shell in vertically spaced assembly position, in readiness for insertion in or its removal from a retaining pocket shown complete thereunder.

Fig. 8 shows the assembly of Fig. 7, i. e., the button shell has been inserted into its retaining pocket.

Fig. 9 is a section on the center line 9 showing the button shell with its package brand display molded or embossed into the transparent material of the button.

Fig. 10 is a greatly enlarged view of the circled area marked 10 in Fig. 9, and showing a detail of the brand name molded and integrated into the button shell, preferably its rear surface.

Fig. 11 is a modification of the molded brand name, and differing from Fig. 9, by providing merely a simple form of decalcomania or other printed sheet (brand indexing means) adhesively or bonded on the rear (inner) surface of the button shell.

*Sheets 1 and 2.—Interchangeable card*

In the drawings, a mounting frame 1 provides a stationary support for the single switch button mechanism illustrative of the invention. An enlargement of this frame, fitted with a group of these buttons, is well adapted to control a vending machine having a large number of buttons.

The mounting frame 1 is provided with a button assembly guide opening 2 of rectangular shape. The button assembly as a whole occupies a generally rectangular space by reason of the fact that it is designed for displaying a like-shaped package brand marking card and is operatively mounted in and through the guide opening 2 and movably confined therein.

A stationary button assembly guide bracket 4 is mounted at the rear of the frame 1. In illustrating one button, the bracket 4 is shown with two parallel legs, the ends of which are fixed on the rear surface of the mounting frame 1 and reaches rearward of and across the guide opening 2 in the frame. It is observed that the bracket 4 is adapted to support the rear end of the movable button assembly, while the guide opening 2 supports the front end thereof, for back and forth motion in relation to the mounting frame 1.

A escutcheon plate has a front face 5, with side edges 6 marginally formed rearward, and is also rectangular in shape. The marginal edges 6 are in-turned along one or more sides of the plate and are shown here (as an example only) at rest against the front surface of the frame 1 to provide a neat finish. The escutcheon plate also has a button-access opening 7 approximating the size of and through which the front portion (the body) of a self-indicating transparent button (next described) is displayed and made accessible to the customer. It is observed that the escutcheon plate 5 is shown herein for one button. It serves as a frame-covering portion, on the front of the machine, and makes a neat finish around the brand button display.

However, in its commercial environment, this plate 5, with its in-turned marginal enclosing side edges 6, frames and forms a finishing cover for a large number (20 buttons, as an example) required by the vending machine heretofore mentioned and thus has an equal number of access openings 7. Observe that the side edges 6 may rest against the outer surface of the console cabinet of the vending machine. The escutcheon 5, as a finishing plate herein for a single button—like a large plate framing a group of buttons—is removably screw-fastened (as shown) to the mounting frame 1 to permit a serviceman to remove it and change the brand name card (Fig. 6) or the brand name button (Sheet 3).

Figure 3:
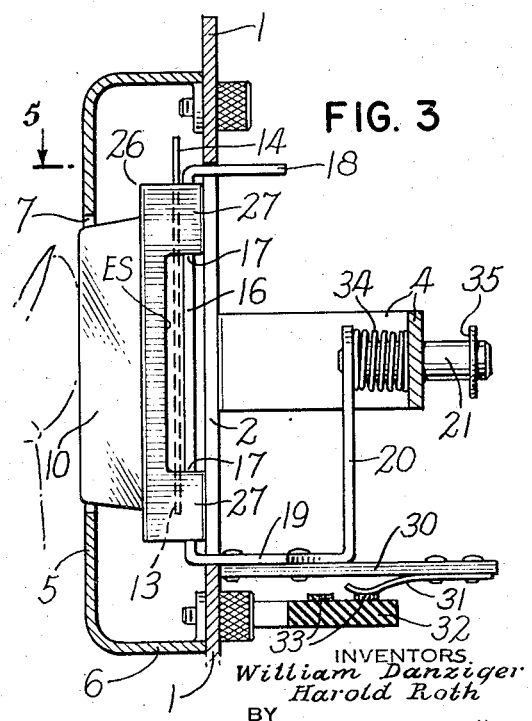
Fig. 3 is a vertical section on the off-center line 3, being an action view. Note the customer's finger actively pressing the transparent button inwardly for shifting (closing) its switch to obtain a selected package.
Figure 5:
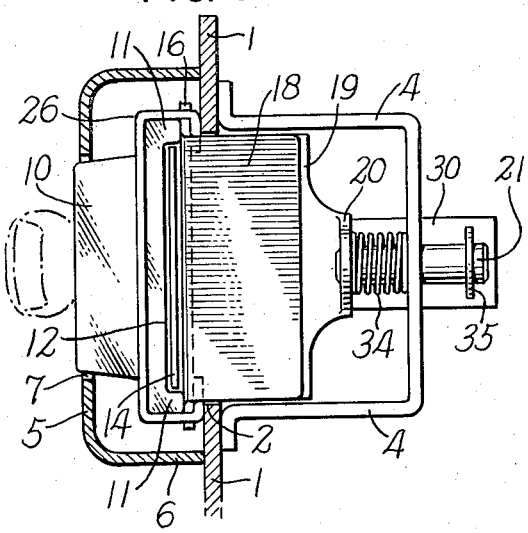
Fig. 5 is a second horizontal cross sectional view on the line 5 of Fig. 3 above the button, and being a top view of the action taking place in Fig. 3.

A transparent button has a front body portion 10 of a size conforming to the access opening 7 in the escutcheon 5. The button is generally of rectangular and pyramidal shape, of attractive appearance, and may be of a thickness about equal to its limited back and forth movements when depressed. Its longer dimension is disposed in upright position. The front surface of the button constitutes a finger pressure area (Figs. 3 and 5). The rear portion or base of the button is formed with an external flange 11 around three sides, being vertically disposed along its two sides and horizontally at its bottom.

The back side of the button is made with an open recess pocket means 12 for supporting a brand name card. This open recess provides a card pocket when the button is fixedly mounted on its chassis. The card and the chassis are hereinafter described. Glass or plastic are suitable materials for this type of transparent button and, for short, it may be referred to as the glass button.

A brand name card 13 is of rectangular shape, conforms to the size of the transparent button recess 12 and, in its upright position, is adapted easily to drop into the recess and be removed therefrom. At its top end, this brand name card has a finger grip tab portion or extension 14 of extra length. The finger grip extension 14 is indicated as being that portion thereof above the dotted line (Fig. 6). The dotted line is not part of the card make-up but merely a means of pointing out that the card is a little longer (has more height) than the vertical dimension of the button recess 12. This extra length of the tab 14 is readily noted in Figs. 2 and 3.

The card 13 is a free (loose) part and is illustrated with the wording "Brand Name" prominently printed on its front face (Figs. 1 and 6), as seen through the front of the glass button 10. However, the picture of a cigarette package is usually printed or embossed on the front face of the card below its finger tab 14. It is clear that the tab extension (over the dotted line) is above the area of the glass button 10 and not a part of its display of the brand name occupying the entire area of the card 13.

The projecting card tab 14 is privided for convenience in removing the interchangeably free card from the button 10 and replacing it with another like card having a different package brand name. Accordingly, when a serviceman desires to stock the vending machine with another brand of packages, he removes the escutcheon plate 5, thus gaining access to the card 13, and lifts it out. A new card is readily inserted and the escutcheon plate replaced.

It is observed that the card tab 14 is concealed by the escutcheon plate 5, the glass button access opening 7 of which exposes only the pyramidal body portion 10 of the button, thus only the card display area 13. Suitable illumination (not shown) within the vending machine and at the rear of the glass button or buttons makes a vivid display of the package brand name on the card 13 through the transparent recess 12 and the body 10 of the button framed within the access opening 7 of the cover plate 5.

A button carrier frame in a form of a mobile chassis 16 is generally of rectangular shape, i. e., occupies a rectangular space. The center thereof is cut out to facilitate illuminating the glass button 10 from its rear. The chassis 16 has a spread at least as great as that of the base forming the flanged glass portion 11 in order to seat against the latter. Note also that this chassis is made with corner edge notches 17 adapted to receive, center and seat a button clasp later described.

At its upper and lower ends, the chassis 16 is also made with rearwardly extending guide plates 18 and 19 (see Fig. 6), of a width comparable to that of the chassis. The two guides are spaced apart in parallel relation slightly more than the length of the button and are of a width (thus overall dimensioned) for an easy sliding (free bearing) fit into the guide opening 2 of the mounting frame 1.

One of the guides (as at 19) carries a pusher arm 20 disposed at right angles thereto. A coil spring retaining guide stem 21 is fixed in the upper end of the arm 20. This guide stem is disposed on an axis perpendicular to the plane of the chassis 16, thus parallel to the two guides, and in a position midway between them.

A button clasp frame 26 comprises a four-sided frame piece with open center dimensioned to embrace the glass button body 10 and to seat down against its flanged base 11. The top margin (marked TM, Fig. 6) of the button clasp seats across the top of the button and confines it (captive) against vertical displacement from its clasp 26. Note also that integral clinching ears 27 extend rearward in alignment with the notches 17 of the button chassis 16.

At this point in the description, it is well to explain that the reference letters TM for the horizontal top marginal frame portion, and also SE pointing to the rear edges (seat edges) of the clasp 26, are applied (Fig. 6) for the special purpose of facilitating a description made in the next topic. The button clasp 26, modified in structural form by the parts designated TM and SE, is embodied in the second example of the invention (Sheet 3), as the clasp 66 therein to match 26 here. The reference letters TM and SE are incidental to the description of the first example (Sheets 1 and 2).

Continuing the description of the first example, it is seen that the clasp 26 is placed over the glass button and against its flanged base 11. The ears 27 rest within the notches 17 of the chassis 16 and are folded inward and around the rear surface thereof. Thereby, the clasp 26 centers the button and its flanged base 11 in relation to and against the front marginal surface of the chassis 16. The front face of the chassis overlaps and closes the two vertical edges and bottom edge of the open recess 12 in the button and converts the recess into a card receiving pocket means open only at its top.

It is now apparent that the brand name card 13 has a free slip-in and slip-out fit within its card pocket, the finger tab 14 being accessible at the top of the button and enclosed as well as concealed by the escutcheon plate 5. From the foregoing, it is observed that the clasp 26 permanently mounts the glass button 10 on its carrier chassis 16, and that this unit provides a simple means of locating and displaying the brand name at 13 through the glass button, thence through the access opening 7 in the finishing plate 5.

Next it is observed that an insulating strip 30 is fixed to the lower guide 19 and carries a downwardly tensioned leaf spring switch blade 31 disposed parallel to the line of motion of the button assembly, being the axis of the guide stem 21. The switch blade is, therefore, a part of the button assembly and is movable with it. A base of insulation 32 is fixed on the rear of the mounting frame 1, carries a pair of circuit contacts 33 (spaced apart a distance equal to the back and forth motion of the button assembly) and is adapted to be transversed by the tensioned switch blade 31.

The electrical contacts 33 are illustrative only as a part of the network circuitry in the vending machine. In practice, they may be printed conductors formed flush on the base of insulation 32, extended along it, and connected with each switch button in the group thereof.

Figure 2:
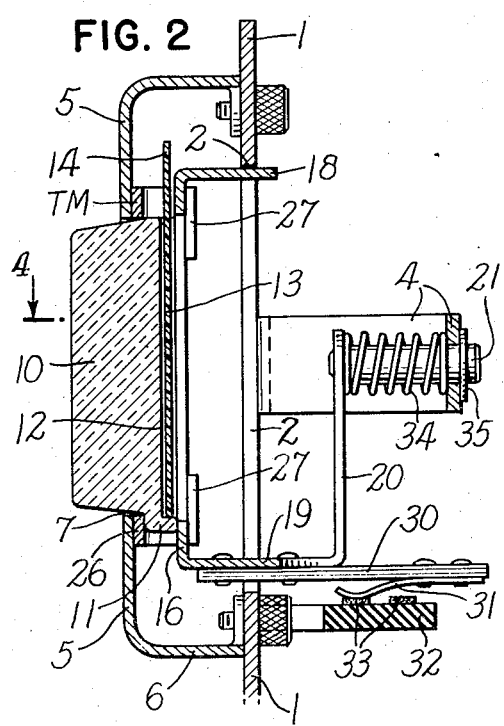
Fig. 2 is a vertical section on the center line 2, being a still view, i. e., with the transparent button in outward normal position and ready to be manually actuated (pushed) by a customer to close its switch.

It is seen that the foregoing switch button assembly is set in place with its two guides 18 and 19 movably resting within the frame guide opening 2, and the stem 21 being inserted in a guide aperture in the center rear crosspart of the mounting bracket 4 (Fig. 2). This final assembly locates the axis of the guide stem 21 perpendicular to the plane of the mounting frame 1 and, thereby, positions the outer surface of the glass button or buttons 10 parallel to the escutcheon 5. A coil spring 34 is now placed under predetermined compression and confined between the arm 20 and the bracket 4.

Figure 1:
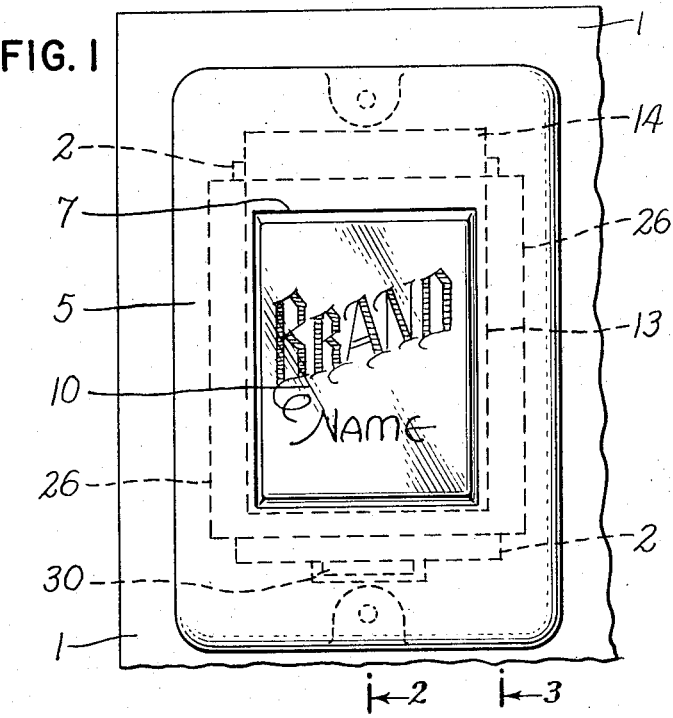
Fig. 1 shows a front view of the transparent button containing a picture card which may be printed with a facsimile of the brand name or other display indicia symbolizing the brand and make of the goods with which it is associated.

It is seen that the spring 34 urges the button switch assembly forward until the clasp 26 comes to rest at or near the escutcheon plate 5, thereby poising the body 10 of the glass button forward and through the access opening 7 of the escutcheon. On the other hand, the inward travel of the button assembly is limited by the chassis 16 coming to rest (stops) against the mounting frame 1 (Figs. 3 and 5). Note that the switch insulating strip 30 passes back and forth through a cut-out notched into the guide opening 2 of the frame, as shown (Figs. 1 and 2).

It is important to observe that a suitable stop means, such as a lock ring 35, is fixed on the rear of the guide stem 21. This stop abuts (comes to rest against) the rear side of the bracket 4 when the button 10 is in its outward position, and also holds the entire assembly in place (in its guides 2 and 4) when the escutcheon 5 is removed for obtaining access to the brand name button card or cards 13 of the single button herein or of a paneled group thereof.

The mounting frame 1 carries the entire movable switch and button mechanism and is simple to install within the cabinet of a vending machine, wherein all parts are enclosed, and the escutcheon 5 imparts a neat finish to the front of the machine.

Figure 4:
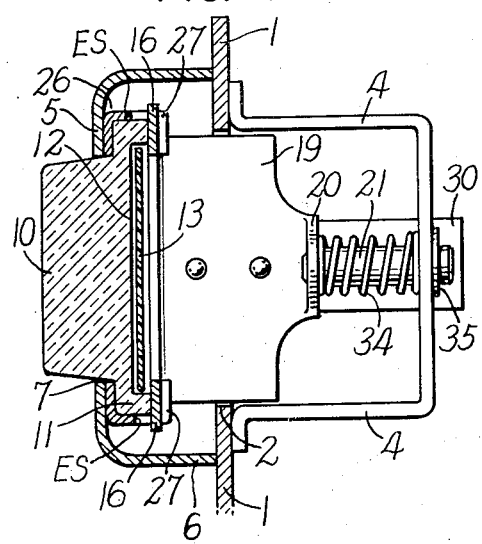
Fig. 4 shows a first horizontal sectional view on the line 4, above the center of Fig. 2, but through the transparent button, being a still view looking down into the simple mechanism.

In the operation of the machine, a customer presses the self-indicating switch button (Figs. 3 and 5), thus displacing it rearwardly and shifting the switch blade 31 from the front to the rear conductor 33. This applies additional compression to the coil spring 34 and, when released, the button assembly is returned to its normal position (Figs. 1, 2 and 4). Thus each brand button in a panel group serves to close its particular circuit for starting a vending machine in operation to deliver a "package pictured" in the glass button.

The cigarette package facsimile or picture card 13 in the brand button 10 constitutes self-instructive operating directions, in that it suggests (tells) the customer to push the package he wants to buy. The vending machine equipped with a group of these buttons is sometimes referred to in the trade as the "Push-A-Pak" machine.

A source of illumination (not shown) is provided in the vending machine which lights up the rear of the glass button or the group thereof. The open center of the chassis 16 and also of the clasp 26 lets the light through to the brand name on the translucent card 13 which is vividly displayed by light diffusion through the glass button 10 standing outwardly through the access opening 7 in the escutcheon plate 5.

The invention provides a compact self-indexing group of buttons, conserves space on the front of the vending machine, and is simple in its sales display for operation by the customer.

*Sheet 3.—Interchangeable button*

This second example of the invention features an interchangeably free button FB instead of the previously described interchangeably free card 13, and thus comprises one part less by omitting the card per se. The second button assembly is similar in structure to the first, embodies some duplicate parts thereof, is package-shaped or rectangular in its geometrical frontal appearance, and differs in mode of use.

In this second example of construction (Sheet 3), letters are used as reference characters (instead of numbers) for differentiating new parts and also for emphasizing structural changes over the captive button 12 with its free card 13 in the first button assembly (Sheets 1 and 2). Letters are selected which are suggestive of the names of the parts they designate.

On the other hand, where the parts are structural duplicates in both examples of the invention, the last digit of each new reference number applied to a duplicate part (in Sheet 3) is that same last digit as in the first example. Therefore, the description is not repeated in full for the duplicate parts embodied in the second example now being described and referred to by the lettering applied in Figs. 7-11.

A shell-like transparent (glass) button is illustrated, being an interchangeably loose part, thus a free button FB, as distinguished from and taking the place of the loose card 13 used in the first example of the invention. This modified button is hollowed out (a cavity button), thus is of light weight, and has its base externally flanged at 41 along three sides, thereby duplicating the flanges 11 in the first example.

The button clasp 26 of the first example is modified to a U-shaped form and marked 66 in the second example. This clasp 66 differs in that the top margin TM (see Fig. 6) is cut out (omitted) when converting the clasp 26 to the free button FB in this second form of the invention. The cut-out top margin TM enables the shell-like button FB to slip in and out of its pocket 42 (comparable with the brand card recess 12), whereas in the first example the top margin TM of the clasp 26 constitutes part of the means which grips and holds the button 10 in permanent position as a captive button.

Another difference is identified by the reference letters SE (Fig. 6) pointing to the two parallel front edges of the first button clasp 26 and forming its side portions. These two seat edges SE rest snugly against the front face of the mobile chassis 46. This is in contrast to the first example of construction where these two edges SE do not seat against the chassis 16 because of the interposed button flanges 11 clamped between the clasp 26 and the chassis 16.

Note also that a button catch BC is made in the form of a detent latch at the upper end of each side of the button pocket 42. This catch comprises a small boss which is dimpled (pressed) inwardly and which imposes a light frictional pressure on (rubs against) the side edges of the flanges 41 when the free button FB is thrust down into its pocket 42 (Fig. 8). One or both of these button catches BC, therefore, establish a close fit of the free button within its pocket and avoid looseness without interfering with its insertion and removal.

Figs. 9 and 10 are presented to show a molded name MN. In other words, the brand name is molded, integrated in color if desired, into the surface of the wall of the button shell FB. Such a molded name MN, used to indicate a package brand, is preferably formed integrally in the rear surface, thus in the cavity of the button, where it is protected from wear or contact with foreign parts and other buttons in a work kit carried by a serviceman.

Fig. 11 shows a modification of Figs. 9 and 10, and illustrates a printed name PN, constituting the brand name of a package. The printed name PN is embossed or printed on a decalcomania or other sheet and adhesively or otherwise permanently attached to the surface of the free button FB, preferably its rear surface.

The self-indicating function of this releasable and detachable free button is similar to that of the combination captive button 10 and free card 13 of the first example of the invention. It is readily changed from one brand name to another in the event servicing the vending machine requires a change in merchandise for that particular button.

The two examples disclosed clearly emphasize related but different points in structural novelty, by which to achieve simiplicity in a self-indicating switch button and demonstrate that the invention is of broad scope.

Characteristic features are common to both examples (forms) of construction. It is observed that both have overall shapes generally rectangular in cross section, and their parts or portions are symmetrically arranged at any point along the axis of the lineal back and forth motion. Also note that the clasping frame member 26 (also 66) and the chassis frame member 16 (also 46) are both bounded by frame portions which leave an open central area after assembling these two parts by forming the clinching ears 27 of one member around the edges of the other.

Likewise the push arm 20 is positioned back from the open area of the two frame-like members 16 and 26 (46 and 66) in a way to let the light (illumination) pass through the glass button 10 (also FB) and thus vividly show through the access opening 7 of the escutcheon 5 to brighten the brand name of the changeably free card 13 or button FB.

This disclosure explains the principles of the invention and the best mode contemplated in applying them, so as to distinguish the invention from others; and there is particularly pointed out and distinctly claimed the part, improvement or combination constituting this discovery as understood by a comparison thereof with the prior art.

What is claimed is:

1. A self-indicating selector push button mechanism comprising an assembly, adapted to a back and forth movement, and having a generally rectangular shape in cross section, which is symmetrically arranged transversely to its axis of movement; a chassis member formed of marginal frame portions, providing a central open area, and a clasping member formed of marginal frame portions, thus also providing a central open area, both open areas being of generally rectangular shape and bounded by their respective marginal frame portions; and clinching ears on one of the members, gripping the other member, and permanently clinching them together, with their respective open center areas symmetrically disposed across the axis of movement; a rectangular shaped pocket formed between the two clinched members, occupying the area of their open centers, and having an open top, with closed sides, as well as a closed bottom; and a changeable package-brand identifier, formed of light transmitting material, of rectangular shape, displayed in the pocket, adapted to be inserted and withdrawn through its open top, being marked with the brand name across the open area of the clinched members, and through which light passes freely.

2. A self-indicating selector push button mechanism as in claim 1, wherein a mounting frame is included in the assembly, and a rectangular shaped guide opening is provided in the mounting frame; a pair of guide plates, integrally formed with the chassis frame member, spaced in parallel relation with each other, being slidably mounted within the guide opening, and movably supporting the forward part of the assembly for its back and forth motion; a guide bracket carried on the mounting frame, in spaced relation therefrom, and reaching across the axis of motion, at the rear of the assembly; a pusher arm carried by one of the guide plates, and extending across the axis of motion, in a position between the guide bracket and mounting frame, but to the rear of the assembly; a slidable guiding stem, disposed coaxial with the axis of motion, cooperating with the pusher arm and with the guide bracket, and movably supporting the rear part of the assembly; and spring means cooperating with the assembly to move it in one direction to its limit, and to hold it in that position.

3. A self-indicating selector push button mechanism as in claim 1, wherein a mounting frame is included in the assembly, and a rectangular shaped guide opening is provided in the mounting frame; the guide opening being dimensioned smaller than the clinched members, and the mounting frame thereby constituting a stop for the clinched members in their back direction of movement; an escutcheon plate spaced forward of the mounting frame, having marginal side edges formed rearwardly and thus enclosing the clinched members, and also enclosing the pocket and the changeable package-brand identifier within the space between the escutcheon plate and the mounting frame; and means detachably fastening the escutcheon plate over the forward part of the assembly, by which the plate is detached to gain access to the package-brand identifier.

4. A self-indicating selector push button mechanism as in claim 1, but having electrical switch means; wherein the forward part of the assembly is movably supported by parallel spaced guide plates, which are integral with the chassis frame member, and which are slidably confined in a rectangular guide opening provided in a mounting frame, which frame is disposed to the rear of the clinched members, thereby to the rear of the changeable identifier; and wherein an escutcheon plate is mounted in spaced relation forward of the mounting frame, and encloses the clinched members, and the open-top pocket, as well as the changeable identifier; and wherein the rear part of the assembly is movably supported by a mounting bracket, spaced from the rear side of the mounting frame, and by a pusher arm carried on one side of one of the spaced guide plates, as well as a stem coaxial with the axis of movement of the assembly, which stem cooperates with the pusher arm and with the mounting bracket; and an insulating strip, to which is attached an electrical switch blade, fixedly mounted on the other side of the spaced guide plate.

5. A vending machine self-indicating push button, made of transparent material, comprising a rectangular-shaped body, having a base at the rear thereof, the base being formed by three flanges, along two vertical sides, and along its bottom side; a rectangular-shaped card-receiving recess provided in the flanged base, and the top side of the recess being open; an open-center frame means, which grips the flanges, and which also overlaps the two sides of the recess sufficiently to convert it into a closed-sided rectangular-shaped pocket, with its top side open as aforesaid; a brand card, which is thinner than the recess, inserted into the pocket, down through its open top side, thus having a loose fit in the pocket, and designating the particular brand of merchandise in the vending machine which is adapted to be delivered by pushing the button; and out through the open-top pocket of which the card for one brand may be withdrawn and replaced by a card for another brand, the card being of rectangular shape, longer than the depth of the transparent pocket, thus providing a finger tab at its top edge, which tab projects above the top edge of the open pocket, and is thus adapted to be grasped by one's finger when interchanging the brand cards in the button as aforesaid; and an escutcheon plate, having a rectangular-shaped access opening, through which the button projects with a close sliding fit, behind which plate the tab portion only of the brand card is concealed; the brand card being observable at the front of the button, and illuminated from the rear, thru the transparent body and through the open-center frame means.

6. A self-indicating push button for vending machines, the button being made of transparent material, having four sides, thus a body portion of rectangular form, and having a base portion, providing an external flange, along at least three sides of the button; two rectangular frame members, having open centers for the passage of light, and formed of marginal portions; one frame member disposed on the underside of the base portion of the transparent button, the other frame member cooperating with the three-sided flange, with the body portion of the button extending through the latter frame member; and means fastening the two frame members together, with the transparent button therebetween, thus providing a button unit; display indicia for a package brand associated with the button unit, and being removable from between the two frame members, and replaceable therein for another package brand; two guide plates integrally formed with opposite marginal portions of one of the frame members, and extending away from it at right angles to its plane, and on the same side of said plane; the two guide plates being parallel, and being spaced apart a distance which locates them outside the area of the open centers, thereby being outside the light entry thereinto as aforesaid; a mounting frame, having a rectangular guide opening, in which the two parallel guide plates are slidably mounted; and spring means, disposed at a distance from the open centers, thereby also being outside the light entry thereinto as aforesaid; the spring means cooperating with the mounting frame and with the button unit, for urging it to normal position against the mounting frame as a stop therefor; and an escutcheon plate, spaced from the mounting frame, enclosing the display indicia, and being removable from the mounting frame for replacing the display indicia with another brand name; and an access opening in the escutcheon plate, through which the transparent body portion of the button is poised for manual operation.

7. A self-indicating push button as in claim 6, for vending machines, wherein a pusher arm is integrally formed with one of the guide plates, at right angles thereto, in spaced relation back from the open centers, and is disposed across the axis of movement of the slidably mounted assembly; an electrical switch mounted on one of the guide plates; and a guide bracket-and-stem means, disposed on the axis of movement, having spring means cooperating therewith, to maintain the button unit and switch in normal position.

8. A self-indicating button means comprising a transparent body, rectangularly recessed in its bottom side; the recess having a bottom edge, and two parallel side edges, with an open top; a four-sided frame means, with an open center admitting light to the rectangular recess, seated on the bottom side of the transparent body, and holding it captive therein; the four-sided frame means also being seated along the bottom edge and along the side edges of the recess, by which the frame means and recess form an open top pocket; a brand name card rectangularly dimensioned for a slide-in and out fit into the pocket from its open top, thereby displaying the brand name in the transparent body; and a finger tab extension formed on the card, projecting outward from the open top pocket, by which to conveniently handle the card when branding the button and changing its brand.

9. A self-indicating button means as in claim 8, wherein an escutcheon plate is provided, having an access opening, through which the transparent captive body projects and is accessible for manual operation; the access opening being rectangularly dimensioned to conceal the finger tab extension; and means detachably mounting the escutcheon plate in position over the transparent body and concealing the finger tab extension, by which the plate may be removed in order to reach the concealed finger tab portion for removing the brand card and inserting another.

10. A self-indicating button means as in claim 8, wherein an external flange is formed along three sides of the body; and the four-sided open-center frame means comprises two frame members, one frame member being seated against the three-side flange, with one side of the frame disposed across the body holding it captive; and clinching ears on one frame member gripping the other frame member, with the button clamped therebetween.

11. A self-indicating button means as in claim 8, wherein an external flange means is formed on the body; and a four-sided open-center clasping frame seats against the flange means; also a four-sided open-center carrier frame in the form of a chassis, seated against the bottom of the body; notch-and-clinch means provided on the two frames, symmetrically locating them in respect to each other, and anchoring them together, with the captive body clamped therebetween, thereby providing a button unit; a mounting frame, having a rectangular guide opening provided therethrough, and spring-actuated-guide means carried on the chassis for operatively supporting the button unit in the guide opening.

12. A self-indicating, interchangeable, button means comprising a rectangular shaped shell-like transparent body, having a front wall, and side walls, forming a cup-shaped body; an external flange on each opposite longer side of the wall, back from the front wall, thus two parallel flanges; display indicia provided on the rear surface of the front wall, thus deep within the shell-like body, and protected from wear by its walls; two rectangular open-center frame members, having engaged seating edges, serving to space the two members apart a distance providing an open-top pocket, having slip-in clearance for said two parallel flanges; and clinching means on one frame member gripping the other and fixing them together as a unit, the transparent body being removable from the open-top pocket for the purpose of interchanging it with another said transparent body having a different display indicia; one of said open-center frame members having four-marginal sides, thus closed on all sides, while the other frame member has three-marginal sides, thus of U-shape form, with one side open, and thereby providing the aforesaid open top for receiving said interchangeable transparent bodies.

13. A manually operable and interchangeable, self-indicating electrical switch button, comprising an assembly, for controlling the operation of a vending machine, in combination with a frame means on the machine, said frame means having an opening, in which said assembly, including a transparent member, is operatively disposed, and in which said assembly is adapted to a back-and-forth motion, when manually pushed and released; also an interchangeable indicia card, mounted in said assembly, indicating a commodity adapted to be vended, the indicia card being visible through the transparent member; and a pocket means provided in said assembly for receiving the indicia card, said pocket means being dimension formed for loosely holding the indicia card in position and adapting such card for manual removal from said pocket means, by which to substitute a different indicia card for indicating another vendable commodity; a finger grip tab extension on the upper end of each of the different indicia cards, said tab extension projecting from the top of said button assembly, to facilitate the manually grasping, handling and interchanging of the different indicia cards, as aforesaid; the different indicia cards being formed of translucent material, adapted to be illuminated from the rear, and visibly displaying their respectively different commodity names, through the transparent member; the aforesaid tab extension, which projects from the top of said assembly as aforesaid, being disposed behind the frame means, and thus hidden from view; and an electrical switch means, included in said assembly, having contacts and a compression spring, which are carried by and mounted at the rear of said assembly, but outside of the path of said illumination, permitting the light rays thereof to pass unobstructed through the translucent indicia card, thence through the transparent member; and said switch means being thus adapted to close an electrical circuit, when the transparent member with its translucent indicia card are pushed as a unit inwardly against the compression spring.

14. An electrical, self-indicating, cigarette-brand selector push button assembly, characterized by a push a package brand button, for starting the operation of a motor driven cigarette vending machine, which stores and sells a large selection of cigarette package brand choices; said assembly having a generally frontal shape proportionately conforming to that of said cigarette packages; a covering-frame portion on the machine, provided with a similar opening, in which the forward portion of the perimeter of said assembly is mounted, for a back-and-forth axial movement therein; said assembly comprising a chassis, having a central open area, for unobstructed illumination of the aforesaid brand-button; and a transparent push button mounted in the chassis, across said open area, in the opening; a pocket means formed in the assembly, behind the transparent button, coextensive with said illuminated open area, and having an open top, with a closed bottom; and one of a plurality of interchangeable cigarette brand cards which is selected for display in said pocket means; said selected card within said pocket means presenting the facsimile of a brand designation of a cigarette package and defining an illuminated push a package card display in the aforesaid brand button, the assembly being adapted to be pushed, selectively from a group of buttons on the aforesaid cigarette vending machine, causing the machine to vend a package of cigarettes of that brand displayed on the illuminated facsimile; and finger-grip tab extensions on the cards, said tab projecting upwardly from the pocket means, and being concealed behind said covering-frame portion, thus not a part of said card display; said tab extensions serving as means for handling the respective cards when removing one from and placing another selected card into the pocket means, for changing one cigarette brand to another; an electrical switch contact mounted on the perimeter of the chassis, at its rear end, remote from and outside of the illuminated open area, to permit said illumination to freely play upon and diffuse through said card display; and a spring-loaded guide-stem means, also carried on the perimeter of said chassis, but at the rear of the latter, thus also outside of said illuminated open area, although supported on said back-and-forth axis, so as to reciprocally guide the rear end of the assembly on said axis; and a bracket means, fixed on the machine, at the rear of the button assembly, in which said spring-loaded guide-stem means is reciprocally supported.

References Cited in the file of this patent

UNITED STATES PATENTS

| | | |
|---|---|---|
| Re. 22,634 | Plensler | Apr. 17, 1945 |
| 778,748 | Howell | Dec. 27, 1904 |
| 826,336 | Kilpatrick | July 17, 1906 |
| 1,333,013 | DeVignier | Mar. 9, 1920 |
| 1,333,015 | Freile | Mar. 9, 1920 |
| 1,389,266 | Newton | Aug. 30, 1921 |
| 1,407,507 | Zopff | Feb. 21, 1922 |
| 1,560,698 | Knudsen | Nov. 10, 1925 |
| 1,658,968 | Carroll | Feb. 14, 1928 |
| 2,082,448 | Guinosso | June 1, 1937 |
| 2,109,790 | Batcheller | Mar. 1, 1938 |
| 2,265,124 | Andres | Dec. 9, 1941 |
| 2,274,059 | Goodwin | Feb. 24, 1942 |
| 2,360,997 | Winston | Oct. 24, 1944 |
| 2,574,933 | Ogren | Nov. 13, 1951 |
| 2,579,168 | Ballou | Dec. 18, 1951 |
| 2,627,685 | Henry | Feb. 10, 1953 |
| 2,639,338 | Kwasniewski | May 19, 1953 |
| 2,660,282 | Gross | Nov. 24, 1953 |
| 2,684,411 | Verkuil | July 20, 1954 |
| 2,701,286 | Slate | Feb. 1, 1955 |
| 2,714,949 | Morin | Aug. 9, 1955 |
| 2,760,288 | Shoenfeld | Aug. 28, 1956 |
| 2,767,498 | Bladh | Oct. 23, 1956 |
| 2,769,069 | Christy et al. | Oct. 30, 1956 |